(12) United States Patent
Oliszewski

(10) Patent No.: US 8,526,048 B1
(45) Date of Patent: Sep. 3, 2013

(54) SYSTEMS AND METHODS FOR THE RELIABLE TRANSMISSION OF FACSIMILES OVER PACKET NETWORKS

(71) Applicant: Mike Oliszewski, Tigard, OR (US)

(72) Inventor: Mike Oliszewski, Tigard, OR (US)

( * ) Notice: Subject to any disclaimer, the term of this patent is extended or adjusted under 35 U.S.C. 154(b) by 0 days.

(21) Appl. No.: 13/727,565

(22) Filed: Dec. 26, 2012

Related U.S. Application Data

(63) Continuation of application No. 12/708,535, filed on Feb. 19, 2010, now Pat. No. 8,339,646.

(51) Int. Cl.
*G06F 15/00* (2006.01)

(52) U.S. Cl.
USPC .................................................. 358/1.15

(58) Field of Classification Search
USPC .................................................. 358/1.15
See application file for complete search history.

(56) References Cited

U.S. PATENT DOCUMENTS

2004/0146050 A1* 7/2004 Burrell et al. ................. 370/352

* cited by examiner

*Primary Examiner* — Saeid Ebrahimi Dehkordy
(74) *Attorney, Agent, or Firm* — J. Curtis Edmondson

(57) ABSTRACT

Described herein is a facsimile to voice over IP adapter for the real-time reliable transmission of audio messages using HTTP, the voice over IP adapter having audio adapter interfaces, the audio adapter interfaces capable of receiving a audio encoded facsimile data stream; ethernet adapter interfaces, the ethernet adapter interface capable of transmitting an HTTP encoded facsimile image; a fax processor, the real-time fax processor capable of receiving a one or more audio streams from the audio adapter interface and packetizing the one or more audio streams into an HTTP encode facsimile image; where the facsimile is capable of being transmitted from a source facsimile machine through an voice over IP adapter, and further transmitted to a destination facsimile machine.

2 Claims, 15 Drawing Sheets

SYSTEMS AND METHODS FOR THE RELIABLE TRANSMISSION OF FACSIMILES OVER PACKET NETWORKS

CROSS REFERENCE TO RELATED APPLICATIONS

This application is entitled to a claim of priority to application Ser. No. 12/708,535 filed on Feb. 19, 2010, which was issued as U.S. Pat. No. 8,339,646 on Dec. 25, 2012, entitled, "Systems and Methods for the Reliable Transmission of Facsimiles over Packet Networks", by Mike Olizewski, the entire disclosure of which is hereby incorporated by reference as if set forth in its entirety for all purposes.

BACKGROUND

1. Technical Field

This invention relates to computer and facsimile transmissions, specifically a method to efficiently and reliably guarantee transmission and receipt of faxes documents from non-internet devices routed through internet connectivity based upon extrinsic circumstances: asynchronously, synchronously, pre-call phone number validation.

2. Terms

The terms "facsimile" and "fax" shall be used interchangeably and refer to data that is transmitted on the protocol generically known as "T.30".

The term "telephonic" and "telephony" shall generally be considered to be the transmission of audio signals on a PSTN ("Packet Switched Telephony Network") according to generally accepted protocols.

The term "ATA" shall mean analog telephone adapter, which shall generally mean a device that interfaces a traditional telephone handset with a TCP/IP interface.

The term "T.30" shall generally mean a protocol for the transmission of facsimile documents that conform to the "Group-2" or "Group-3" protocol.

The term "HTTP" shall generally mean Hypertext Transfer Protocol (HTTP) which is an application layer protocol for distributed, collaborative, hypermedia information systems.

The term "SIP" shall mean the Session Initiation Protocol which is a signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams.

The term "ITU G.729" is an ITU (International Telecommunications Union, www.itu.int) standard codec. It offers toll quality speech at a reasonably low bit rate of 8 Kbps.

The term "PSTN" shall mean a public switched telephone network (PSTN) is the network of the world's public circuit-switched telephone networks.

3. Introduction

For more than a decade now facsimile (aka fax and/or faxing) has been an important staple in business communications. It has provided secure, reliable real-time and legally significant document transfer. Features which many more modern platforms have attempted to replace but for which have yet to achieve any significant market share. While the technology has been evolving, the original T.30 protocol has mostly seen minor modifications to accommodate faster data transfer encodings (i.e. V.17 with speeds at 14400, 12000 9600, 7200 bps.)

Now referring to FIG. 1 illustrating the prior art method 100 of a typical fax transmission. A call is started 110 by dialing a phone number 115. If the fax tone is detected 125, 130 then a fax transfer is initiated 150 by transferring sequential data blocks 155 via T.30 160 until the fax is complete 165.

Now referring to FIG. 2 depicting the prior art system 200 of a first fax machine 210 connected to a second fax machine 220 via a PSTN 230. The connections from the fax machines 210,220 is well known in the arts and can be done via regular telephone line wire, a channel bank, and/or other similar technologies.

Although the use of facsimile transmissions is well known in the prior arts and familiar to most individuals, the architecture of a typical PSTN and method of sending faxes are depicted on FIG. 1 (method of transmitting a fax) and FIG. 2 (architecture of the fax communication through a PSTN) to provide a background.

As the fax machine became more and more popular a need for volume processing, automation and elimination of consumables became in high demand, leading to the creation of "fax servers". The prior art architecture 300 of a typical network utilizing a fax server 360 is shown on FIG. 3. The general operation of a typical fax server 360 consists of using a computer workstation 310 to send fax documents 315 to the fax server 360 via proprietary protocols using an email_server 320 and/or webserver 330, the fax server 360 then converts the fax documents 315 to fax images 365, the fax server 360 then streams the fax image to the PSTN to the dedicated fax hardware 210 and which is connected to a phone line 205 T.30 lines, to determine if the transmission was successful, the fax server 360 then queues the fax result, the workstation then queries the fax server 360 for result. The implementation of the first generation of fax server 360 was based on dedicated computer based telephony cards which solely performed the task of sending and receiving fax via the standard telephone network (PSTN 230). As the internet became popular, the desire for users to have faxes sent and received from email came into high demand. This requirement necessitated that fax servers directly communicate with email servers. Electronic fax services were developed provided this functionality without the user having to own fax machines or fax servers. To standardize the method in which companies could integrate fax with email, the T.37 specification was created and very widely adopted. Because users did not commonly have tools for converting documents to TIFF Class F document format as required by T.37, fax servers additionally had to provide programs or services to perform this conversion automatically for users (e.g. to convert a TIFF Class F document to the Adobe PDF format).

The use of the email to fax system consists of the following steps as further shown on FIG. 4. The workstation 310 sends a fax document to the email server 320 via the T.37 protocol, the email server 320 sends fax documents to the fax server 360 via various networking protocols, the fax server 360 then converts documents to fax image, the fax server 360 then streams the fax transmission to the PSTN via dedicated fax hardware using the T.30 protocol 455 460. When the fax document transmission is complete the fax server 360 then emails a notification which is then retrieved by the workstation.

As local private networks continued a fast paced adoption of internet technology throughout all market segments the demand for doing telephony over IP became a dominant theme. This lead to the creation of a "media gateway" for the purpose of transporting voice, fax and data over IP. This introduced a large number of new protocols, standards and problems. The industry first attempted to use audio protocols such as G.711/RTP to carry fax data, but then adopted T.38 as the preferred protocol for faxing over IP.

As noted, the term "ATA" shall mean an analog telephone adapter, which shall generally mean a device that interfaces a traditional telephone handset and/or traditional fax interface with a TCP/IP interface. "ATA's" referred to as VoIP Gateways, TA (Terminal Adapter), FXS Adapter, etc. Most common ATAs use either the SIP (session initiation protocol) or IAX industry standard protocol. An exemplary architecture that demonstrates the connection of a traditional fax machine that is normally connected to a PSTN, but connected to an ATA is shown on FIG. 5. Now referring to FIG. 5 where the ATA 520 is connected to the fax machine 510. The ATA 520 is further connected to the Internet 340.

While T.38 was created with packet networks in mind, it was not designed for use over the open internet. The following issues were left unresolved:

i) T.38 has no inherent facility to provide encryption or secure transport over the internet. This means that those market segments which are regulated by HIPPA and SOX compliance regulations are prohibited by law from using it.

ii) While T.38 was designed to significantly improve the ability for fax transmission to work with a certain degree of packet loss and latency, the internet has proven to often provide and even lower quality of network than T.38 can survive.

iii) Because T.38 was designed with local and private networks in mind, the concept of cost per packet was not considered. This translates into T.38 being significantly more expensive than other audio transport protocols.

iv) An unexpected problem with T.38 was that the Media Gateway companies implementing it were not focused on Fax solutions and thus did not invest as heavily into implementing T.38 which led to a large number of incompatibilities between vendors. Most still struggle today to have truly reliable fax even when communicating between their own devices.

Now referring to FIG. 7. The method of using the traditional fax machine with an ATA is typically as follows. The fax machine transmits fax images to the ATA via T.30. The ATA then transmits fax image(s) over network (and/or internet) to a media gateway using the SIP, MGCP, H.323, G.729, G.711, and/or T.38 protocols. The Media Gateway then transmits any image via PSTN using T.30 to the destination fax machine.

While this architecture for transmitting facsimile documents using ATA's is possible, it has some inherent limitations as a consequence of the use of the T.38 protocol. For example, T.38 has no inherent facility to provide encryption or secure transport over the internet. As a result, users that desire HIPPA and/or SOX compliance regulations may be prohibited from using it. Also, despite that T.38 was designed to significantly improve the ability for fax transmission to work with a certain degree of packet loss and latency, the internet as a transmission network often has even lower quality of network services that can make T.38 viable. Furthermore, since T.38 was designed with local and private networks in mind, the concept of cost per packet was not considered. As a result, the use of T.38 on metered networks is significantly more expensive than other audio transport protocols. Finally, an unanticipated problem with T.38 is that the Media Gateway companies implementing it as a protocol, has resulted in a large number of incompatibilities between vendors and/or service providers.

When fax machines migrated to using VoIP media gateways, fax servers likewise made the same migration, as shown in FIG. 6. Unfortunately this simply exacerbated the aforementioned problem due to the larger volumes of facsimile data sent by the fax server as compared to a single fax machine.

The typical operation of a fax server with a media gateway is as follows and as shown in FIG. 5. The Workstation sends a fax document to fax server via proprietary protocols. The Fax Server converts the document to fax image. The Fax Server then streams fax image to media gateway via the SIP, MGCP, H.323, G.729, G.711, and/or T.38 protocols. The Media Gateway the streams fax image to PSTN via the T.30 protocol. After the facsimile has transmitted, the queries and queues the result from the Fax Server. The workstation then queries the fax server for a transmission result.

Now referring to FIG. 6, the operation of the Media Gateway with an email connection is illustrated. The workstation sends fax document to email server via T.37. The Email Server sends fax document to fax server via various techniques. The Fax Server then converts document to fax image. The Fax Server streams fax image to media gateway via SIP, MGCP, H.323, G.729, G.711, and T.38. The Media Gateway then streams fax to PSTN via T.30. The Fax Server emails a notification of fax transmission. The Workstation then retrieves email notification.

One attempted solution to the problem of using T.38 over the internet was to create an ATA which utilized a store and forward model of communication. This architecture is similar to the email to fax model computer based users were becoming comfortable with. This design created a number of new limitations which has prevented wide adoption of the technology.

The store and forward architecture adds a significant additional cost to the manufacturing cost of the ATA device. The design requires that the device be able to completely buffer the entire contents of the largest fax it would support sending. While not as frequently performed as sending 1 or 2 page faxes, it is well known that many users indeed send 100 to 500 page faxes on occasion.

Also a single page with a high graphical content can exceed a megabyte in size. As such a series of graphically intensive faxes can significantly increase the storage requirements of the ATA. This extra memory requirement increases the product cost which may limit potential purchasers.

The operation of the first attempted solution is shown on FIG. 9. In the first step the fax machine then transmits the fax image to ATA via T.30. Then the fax machine/server transmits the fax image to the fax gateway (FG). The Fax Server then Streams the fax image to Media Gateway via SIP, MGCP, H.323, G.729, G.711, and T.38. The Media Gateway then transmits the fax image to PSTN via T.30. The fax server then queues the results from the Fax Gateway. The Fax Gateway prints then prints a notification to Fax Machine.

It is a requirement by the FCC that any device which provides a handset and a standardized telephony dial tone must support the ability to dial 911 for emergency calls. As a consequence, the majority of the fax machines must support a dial tone interface. For a fax device that is connected to an ATA to successfully operate without modification, the ATA has to simulate a dial-tone and full standard telephony operation. However these devices were specifically designed for fax, and thus did not support real-time audio operation.

End Users and operators have discovered that fax machines connected to ATA's additionally did not operate as expected. In the operation of a standard fax machine a user takes the phone off hook, and listens in real-time to the audio for the dial and answer of a remote device. This allows them to instantly hear if they mis-dialed the number. In a store and forward model there is no live audio associated with the call, only a simulated audio session. This means that an entire 100 page fax will be scanned and sent to a remote server before any indication of failure will be presented to the user. Typically requiring them to rescan and send the fax.

Therefore, the configuration of these media networking communication systems requires much information and configuration to obtain optimal operation and functionality by each of the individual components and on the larger system as a whole entity. This continues to be an urgent issue due to the speed and number of changes that are increasingly developed, disseminated, and implemented by all of the various vendors involved with these complex media networking systems. The integration, stability and reliability is routine in question due to the vast number of networking components involved and the amount of effort and time really necessary to prove full interoperability is successful without any degradation of the networking systems.

The "scan and send" of large amounts of data through fax devices remains a vital part of day to day operations for many businesses. The merging of this faxing data stream on to the IP network is happening through various avenues, but each mechanism has left unresolved issues for the fax users to deal with.

SUMMARY

The present inventive subject matter overcomes problems in the prior art by providing a facsimile to voice over IP adapter for the real-time reliable transmission of audio messages using HTTP, said voice over IP adapter having a multiplicity of audio adapter interfaces, the audio adapter interfaces capable of receiving a audio encoded facsimile data stream; an ethernet adapter interface, the ethernet adapter interface capable of transmitting an HTTP encoded facsimile image; a real-time fax processor, the real-time fax processor capable of receiving a one or more audio streams from the audio adapter interface and packetizing the one or more audio streams into an HTTP encode facsimile image; such that a facsimile is capable of being transmitted from a source facsimile machine through an voice over IP adapter, further transmitted to a destination facsimile machine. The facsimile to voice over IP adapter as also has a real-time fax processor further comprising a SIP/RIP audio interface, the SIP/RIP capable of interfacing to a media gateway. The facsimile to voice over IP adapter also has a real-time fax processor with a T.38 Fax Data interface, the T.38 Fax Data capable of interfacing to a media gateway.

The present inventive subject matter overcomes problems in the prior art by providing a media gateway for the real-time reliable transmission of fax server images, the media gateway having an ethernet adapter interface, the ethernet adapter interface capable of receiving an HTTP encoded facsimile image; a PSTN interface, the PSTN interface capable of transmitting facsimile encoded audio signals; a media processor, the media processor capable of receiving one or more HTTP encoded audio signals from a voice over IP audio adapter interface; so that the media processor packetizes one or more audio streams into an HTTP encode facsimile image; such that the HTTP encoded facsimile image is capable of transmitting over TCP/IP.

The present inventive subject matter overcomes problems in the prior art by providing a method for the transmission of facsimile images over the internet, said method with the steps of a fax machine, the fax machine capable of streaming audio to an ATA; the ATA streaming bi-directional audio data to a fax server using the HTTP(s) protocol; the fax server further streaming audio data to a Media Gateway via SIP-G.711 and/or G.729 RTP; and the media gateway further streaming bi-directional audio to a PSTN. The method for the transmission of facsimile images over the internet further having the steps of the media gateway detecting fax tones from the audio stream. The method for the transmission of facsimile images over the internet further having the step of the ATA detecting fax tones from audio stream. The method for the transmission of facsimile images over the internet further having the step of the ATA switching to the Fax mode equivalent to the T.38 REINVITE status. The method for the transmission of facsimile images over the internet further having the step of: the fax machines streaming the fax image to the ATA via the T.30 protocol. The method for the transmission of facsimile images over the internet further having the step of the ATA streaming fax image data to the fax server via HTTP(s). The method for the transmission of facsimile images over the internet according to claim 5 further having the step of: the fax server buffering image data. The method for the transmission of facsimile images over the internet further having the step of: the fax server initiating a second call via the media gateway using SIP-G.711/G.729 RTP protocol. The method for the transmission of facsimile images over the internet further having the step of the fax server streaming fax images to the media gateway using the SIP-G.711/T.38 protocol. The method for the transmission of facsimile images over the internet further having the step of the media gateway streams fax images to PSTN using the T.30 protocol. The method for the transmission of facsimile images over the internet further having the steps of the fax server notifying the ATA of the fax result and the ATA printing the notification on the fax machine.

The foregoing is not intended to be an exhaustive list of embodiments and features of the present inventive subject matter. Persons skilled in the art are capable of appreciating other embodiments and features from the following detailed description in conjunction with the drawings.

DETAILED DESCRIPTION

Figure 1:
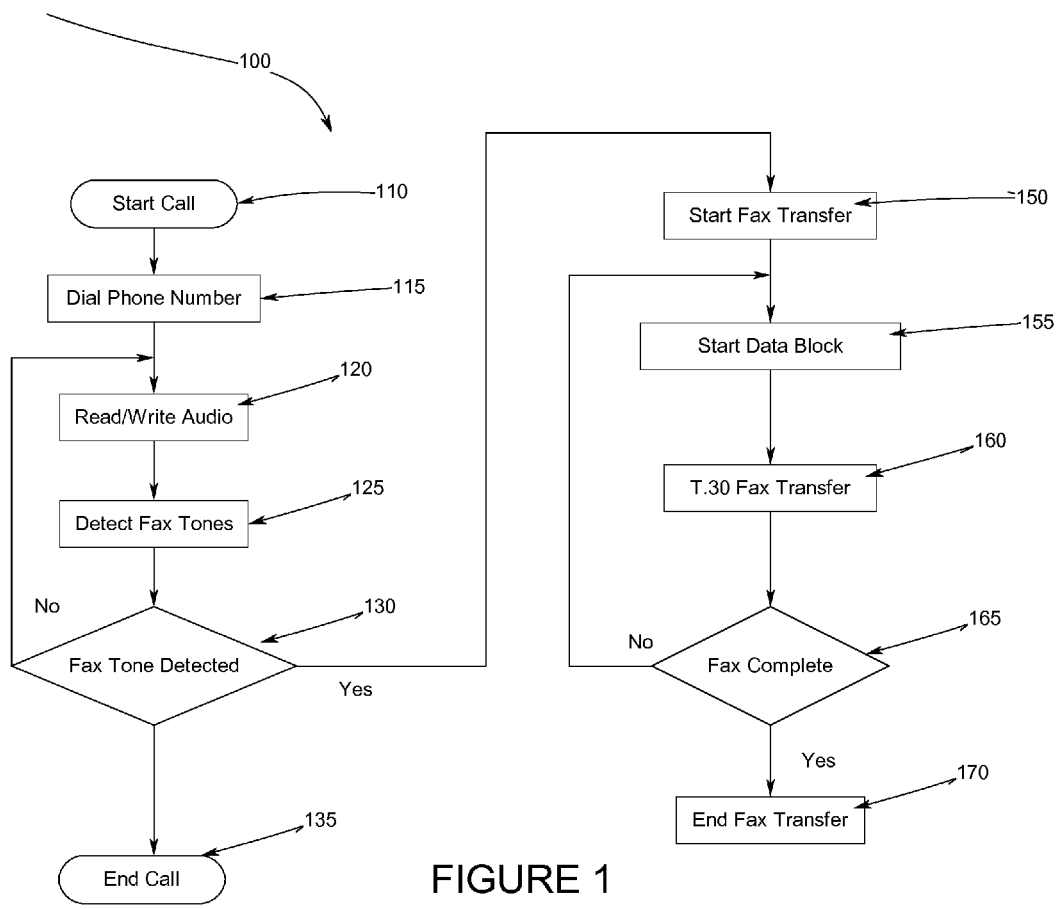
FIG. 1 shows a flowchart of the method of faxing on a traditional PSTN.
Figure 2:
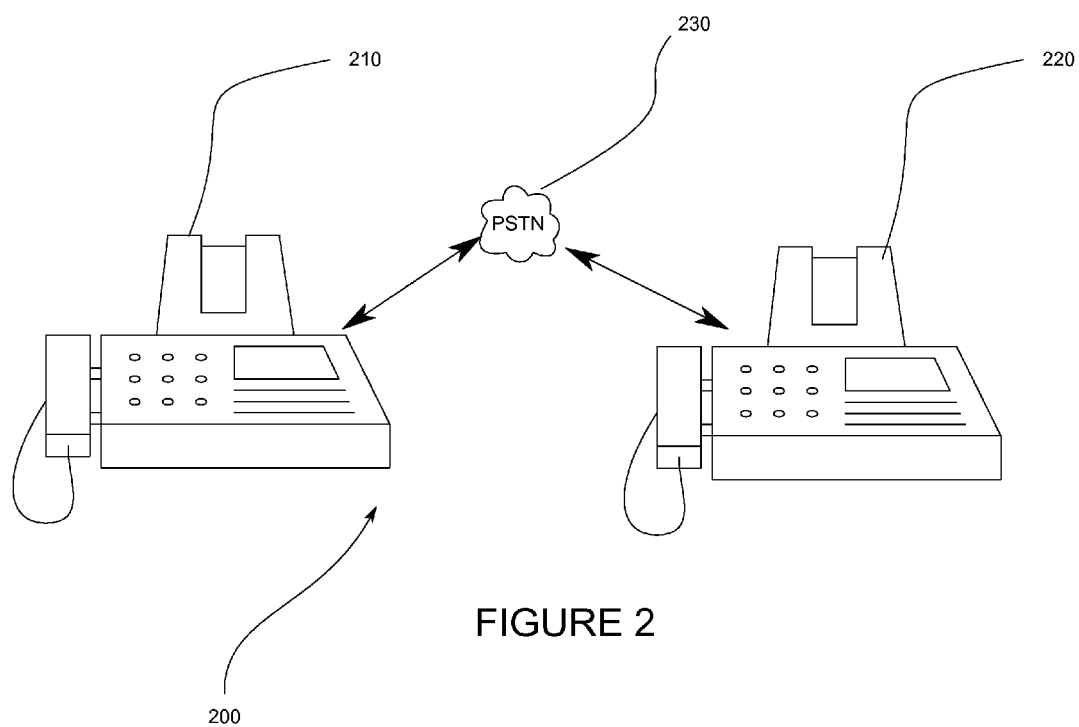
FIG. 2 shows a diagram of the interconnection of two facsimile machines on a PSTN network
Figure 3:
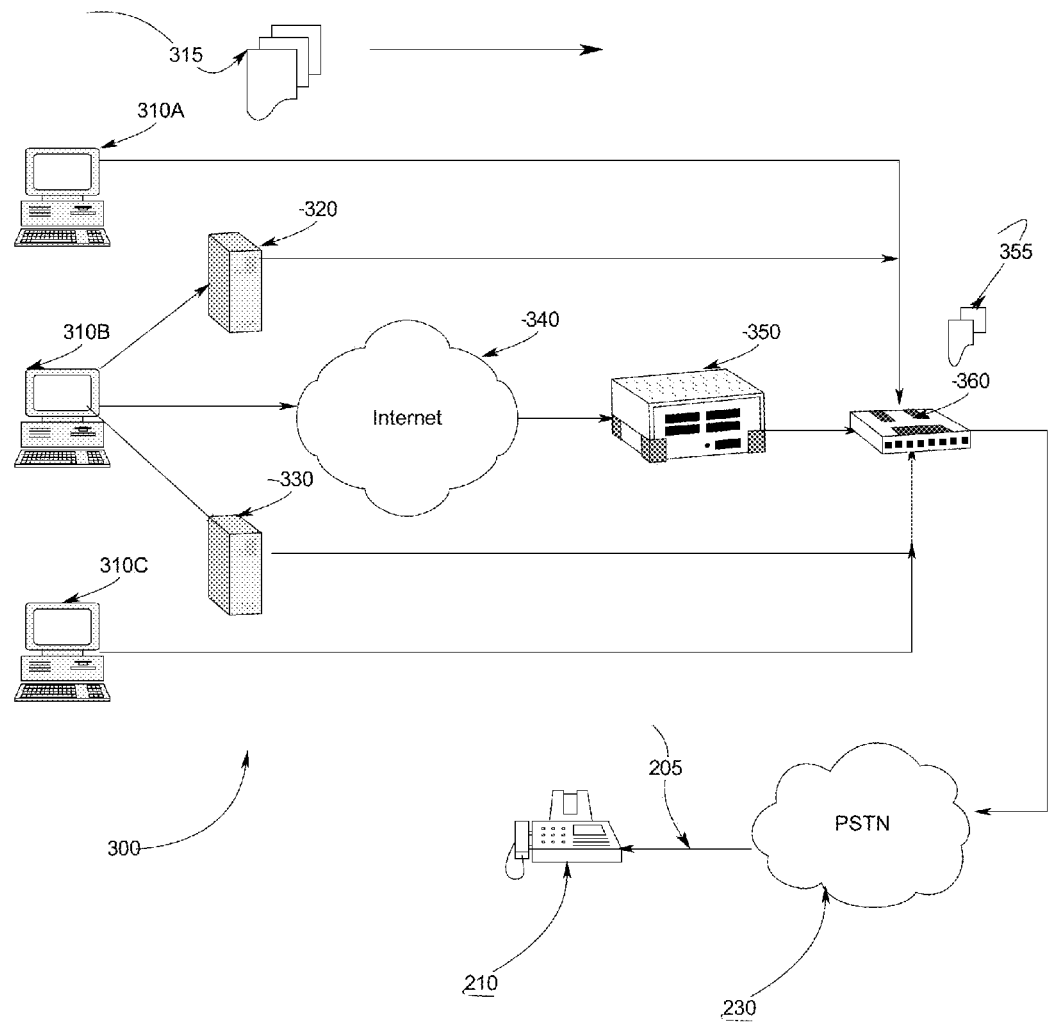
FIG. 3 illustrates a systems diagram of workstations, email servers, and web servers, connected to the internet, which are interconnected to fax servers and the PSTN network.
Figure 4:
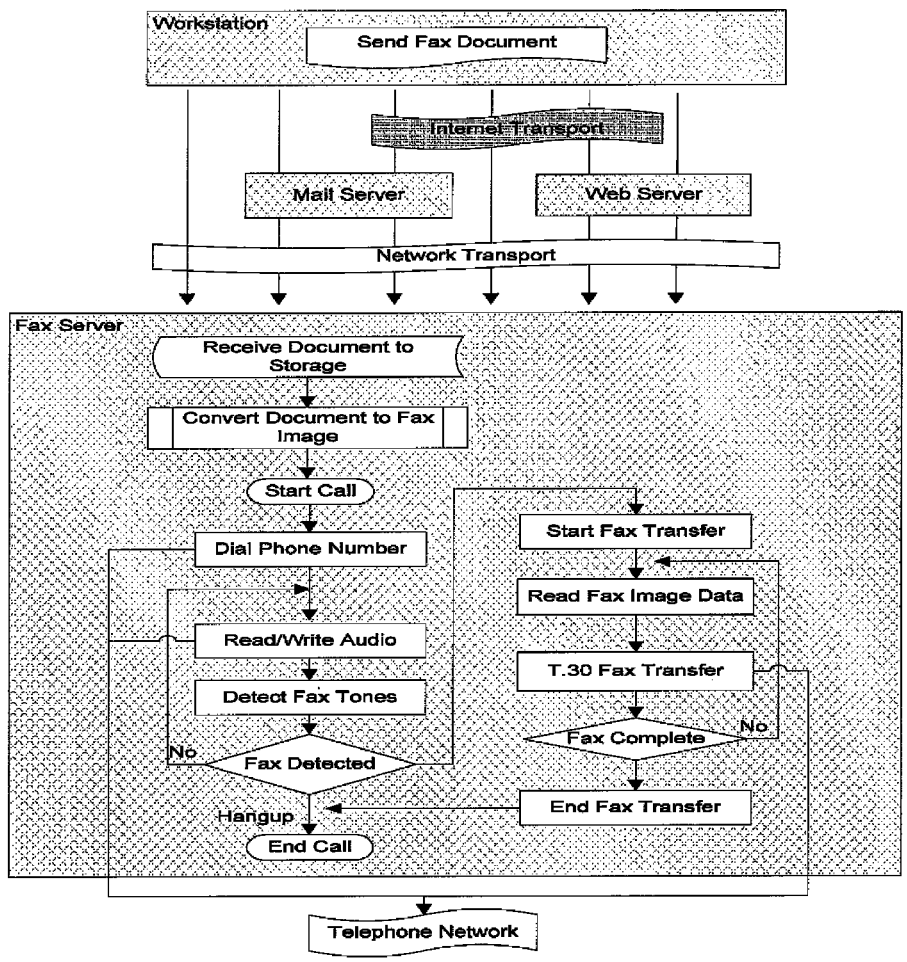
FIG. 4 shows a flowchart of sending documents on a fax server.
Figure 5:
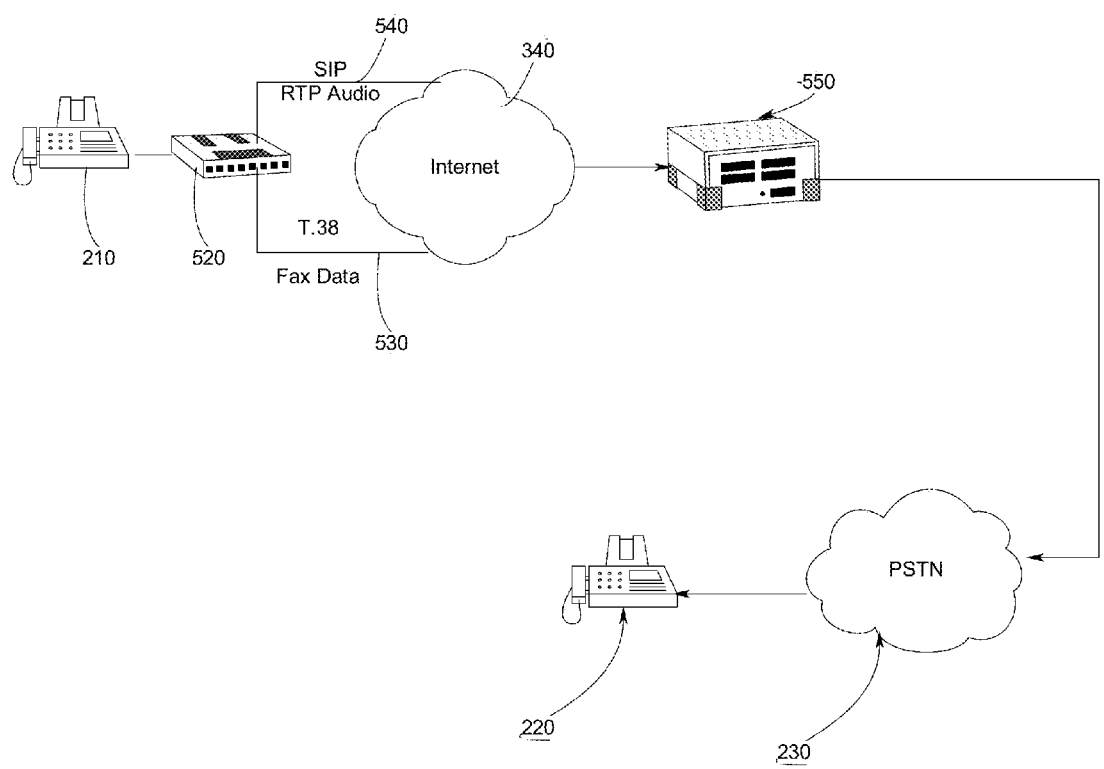
FIG. 5 is a diagram of a fax machine connected to an ATA.
Figure 6:
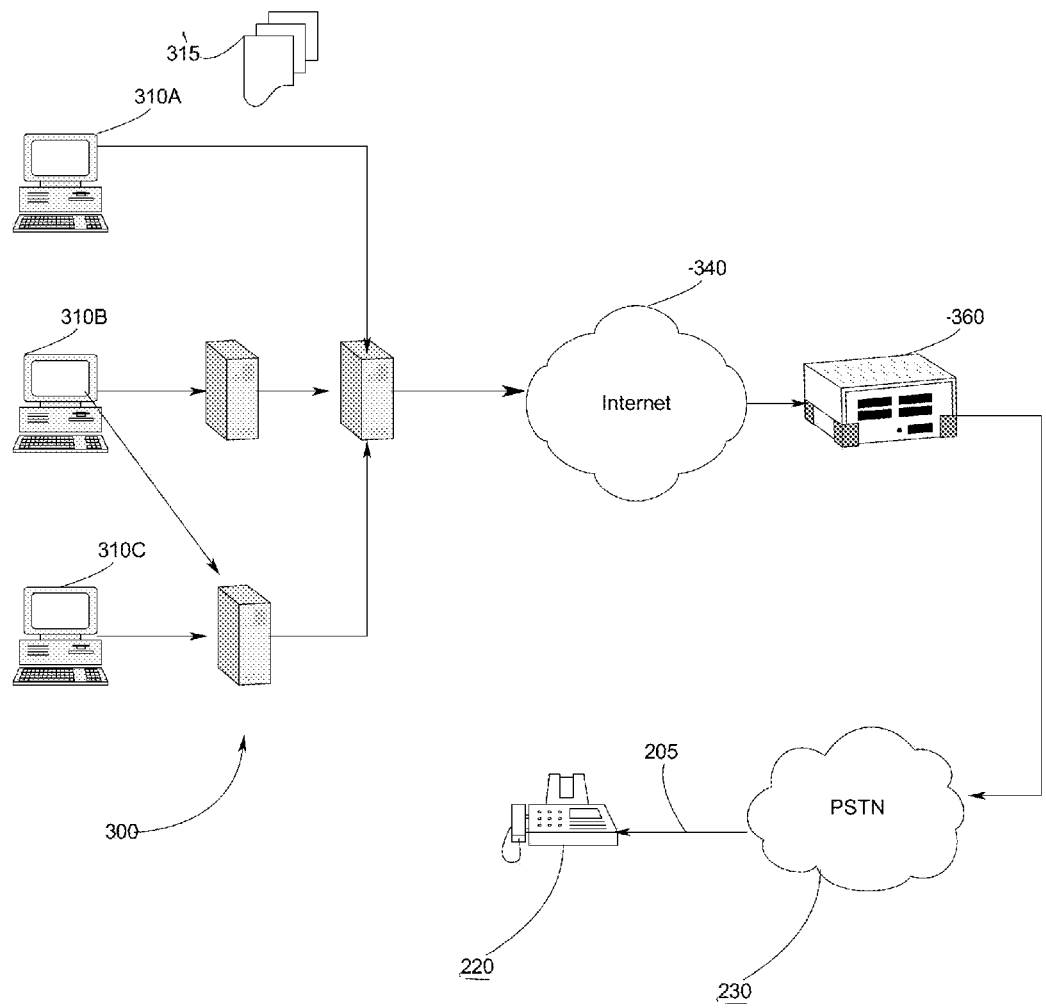
FIG. 6 is a diagram of email, web servers, and fax servers connected to a media gateway.
Figure 7:
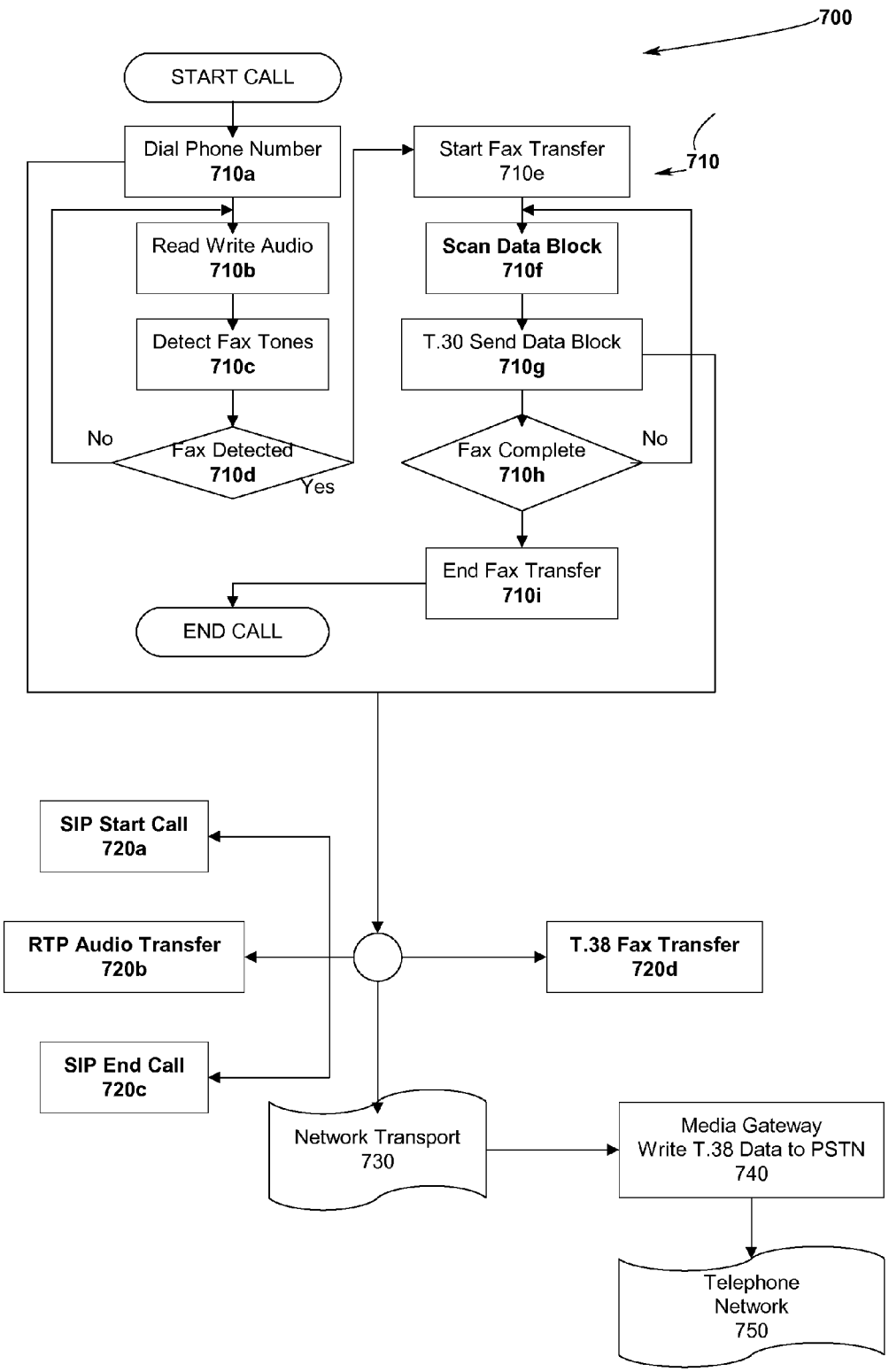
FIG. 7 is a flowchart of the fax machine transmission of information to an ATA.
Figure 8:
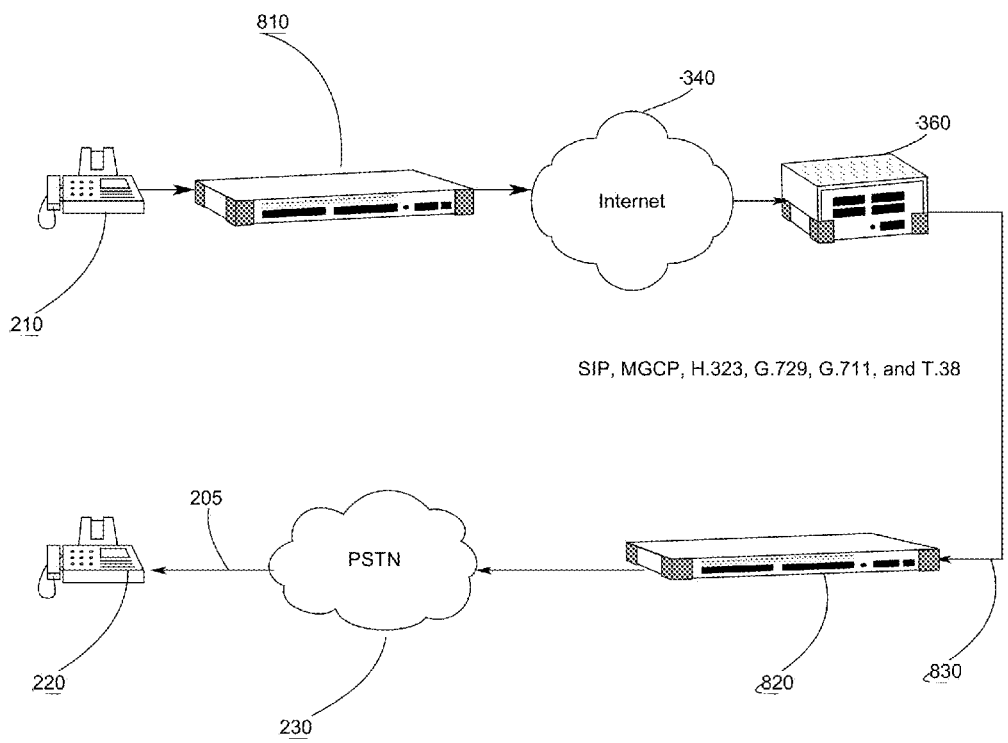
FIG. 8 is a network diagram of a fax machine connected to a fax gateway and a fax server via the internet.
Figure 9:
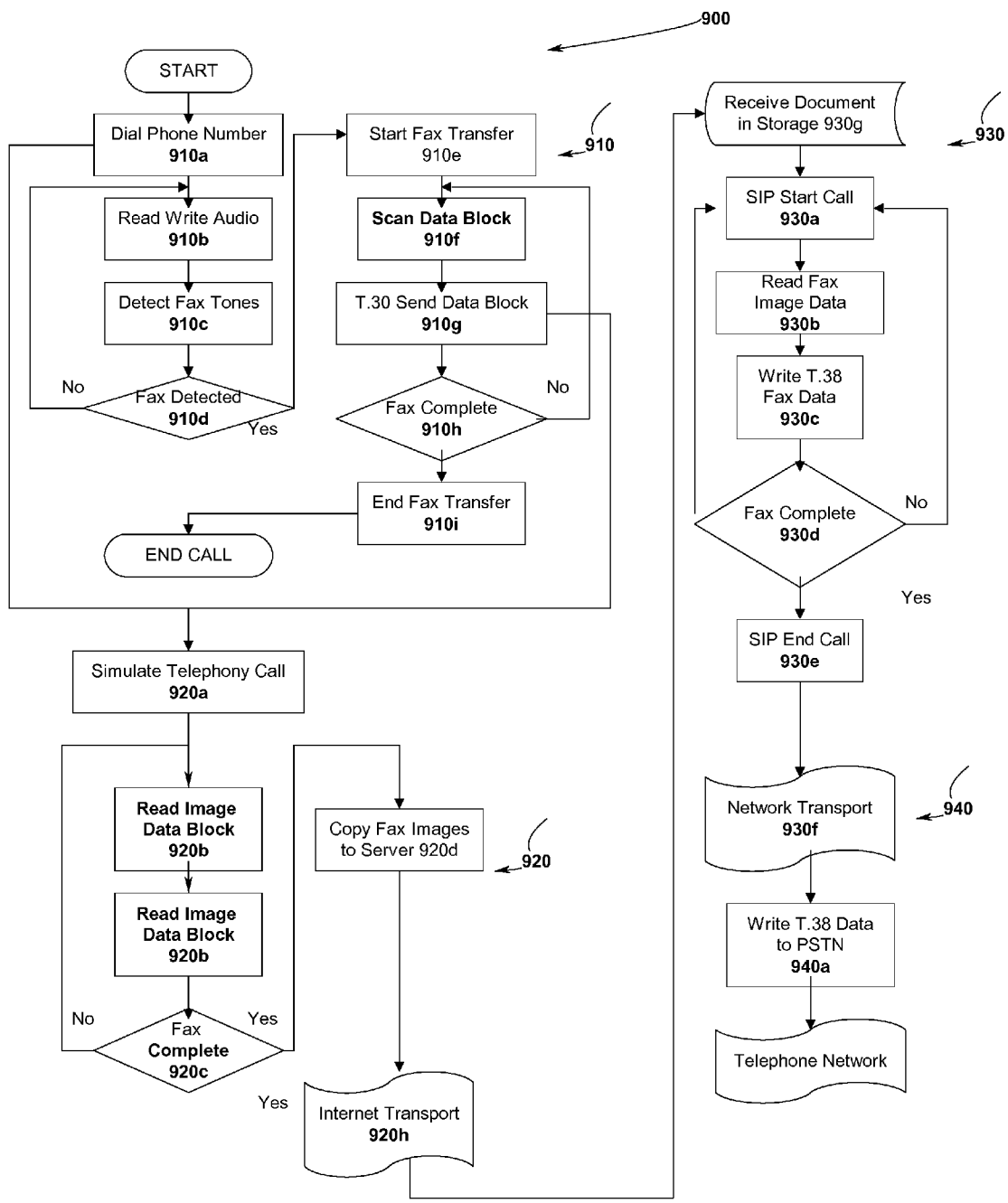
FIG. 9 is a flowchart of the transmission of data from a fax machine to a fax gateway to a fax server.

Representative embodiments according to the inventive subject matter are shown in FIGS. 1-14, wherein similar features share common reference numerals.

The inventive subject matter described herein a HTTP(s) enabled fax device that allows fax machines to be able to transparently and reliably stream real-time data over a low quality of service packet switched network. Furthermore, the inventive subject supports the use of a server to process streaming data (e.g. real-time network data transmissions) to and from these devices in a manner fully compatible with all T.30 compliant fax devices currently in operation. This solution is also applicable to VoIP protocols such as T.38 or G.711 protocols that send and receive fax over low quality of service networks.

There are two exemplary embodiments of this proposed solution. The first embodiment involves changing the protocol used for transmitting fax data over low quality networks from G.711 or T.38 to a more heavily buffered packet loss and latency tolerant HTTP(s) transport and the other which breaks the fax transmission process into two distinct calls. By using an internet friendly data transport process in combination with separating the phone number validation process from the fax data transfer process, a very high level of reliability can be achieved over a reasonably low quality of service network, such as is common with Wi-Fi, cellular, or satellite internet connections.

The usage of HTTPS as a transport vehicle provides a commonly accepted and standardized model for both reducing the required bandwidth to transfer fax data and encrypting the data for security and compliance regulations.

If you analyze the process of sending a fax from a user's perspective there are two distinct processes. First the validation of the phone number and connecting to the fax device which involves standard audio signal processing techniques and second the transferring of the fax image. By breaking these processes into two distinct phone calls one can transparently simulate a single call send process from a user's perspective while eliminating the need for the fax machine to stay 100% in real-time sync with the recipient fax device. The added advantage of breaking these two processes into distinct calls is that protocols providing the highest level of quality can be used for each of the processes rather than trying to use a voice protocol to transport fax image data.

Where network quality is adequate enough to process reliable fax transfer the HTTP(s) architecture is still preferred as it provides standardized encryption, lower data bandwidth consumption and is far easier to configure for NAT firewall traversal.

For inbound faxes being delivered from a fax server and passed to a fax machine or server the process is simpler because the audio processing is not required. Unlike conventional store and forward fax servers, this invention maintains the user's real-time fax experience. Data caching provides protocol resilience while preserving the essential's of a real-time connection between the fax devices at each end. Just like a standard fax transmission, the sending device knows if the fax transmission was successful before disconnecting the session. This inventive embodiment does HTTP(s) to VoIP protocol conversion while maintaining full T.30 compliance.

1. HTTP(s) Enabled ATA, Digital Sender or Fax Machine

Figure 10:
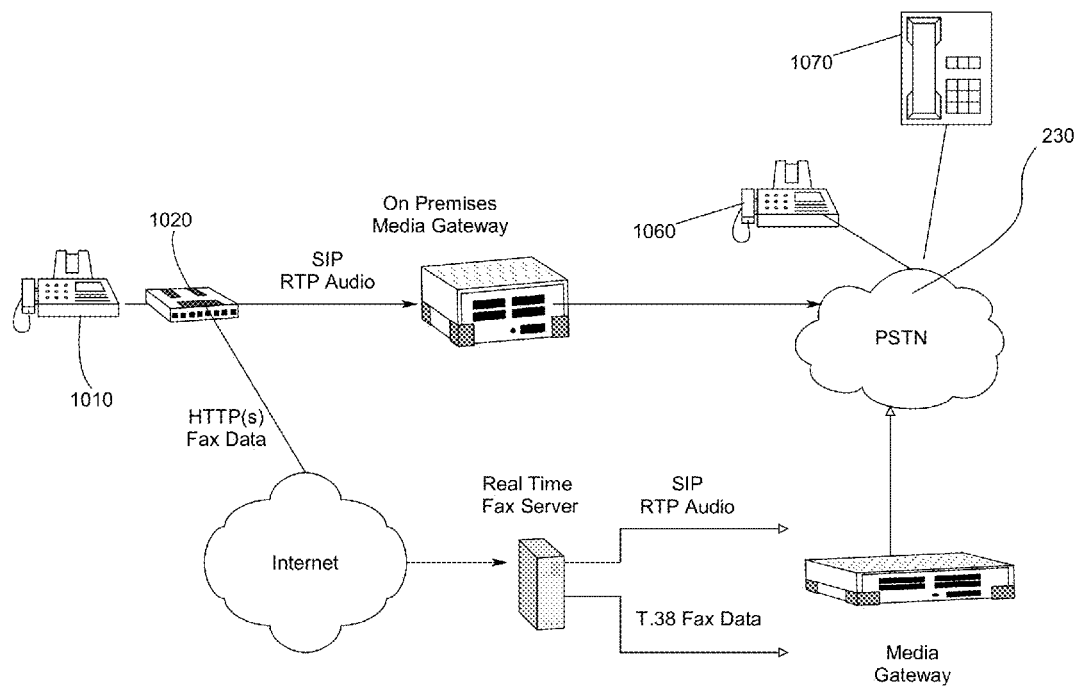
FIG. 10 is a network diagram of the fax machine connected to the media gateway to the PSTN which are then interconnected to a Fax machine.

Now referring to FIG. 10 which depicts a network diagram 1000 illustrating a fax machine 1010 connected to an intelligent HTTP(s) enabled ATA device 1020, or fax server 1030, or a digital sender can initiate a fax send request with a remote streaming fax server 1030 via a simple binary or XML web service HTTP(s) request.

In operation, the remote device sends as part of the fax send request: 1) a number to dial; 2) calling phone number; 3) calling station identification; 4) allowed transfer speeds, image and compression types and any other data required for authentication and document transfer.

The sending device may then optionally also stream audio to the server and poll the server for received audio data. The audio feeds on both the sender and receiver side will be deliberately held up for a configurable period of time so-as to improve audio playback quality in environments with packet loss and inherent latency. This method will allow the transmission of audio data to work using popular data transport protocols, namely HTTP(s).

Since the audio portion of a fax call is not typically used for conversation this provides nearly transparent device configuration with typical call scenarios having no perceived latency due to the unidirectional nature of audio stream.

This method also provides a simplistic transport and access to emergency service communication that is required for 911 and e911 processing.

The sending device then polls the server for a connection state of "connected" to occur. Once the connected state is seen by the sending device the audio portion of the call ends and the fax transfer process begins. The intelligent HTTP(s) enabled ATA device can pass through or emulate the fax tones to the locally connected fax device to insure reliable fax detection by the local device. For proper operation, the intelligent HTTP(s) enabled ATA device must locally simulate a dialog with the fax machine as there is no real-time data actually being exchanged. The remote devices capabilities, transfer speeds and compressions together with the station identifier are all set according to an imposed configuration rather than determined by the actual physical data exchange.

The sending device then streams the fax image to the server as rapidly as the data becomes available and the server can receive it. If network retransmissions are required or a temporary service outage occurs the device will locally buffer the data and continue to retry the data transfer until successful. The locally connected device will not have any visibility to this processing behind the scenes. During the streaming send process the sending device can poll the server for call progress information which would include such details as connection state, remote station identification, current page and percent complete of a current page. Upon sending the last scan lines or data block to the remote server, the sending device/client begins a polling process of the server for a final transmission status until fax transmission is complete at the server. Once the sending device has seen the final status it then must acknowledge to the server that it has received the final status, thus closing the loop on both ends.

When the sending device is a fax server or digital sender the process as described is complete and requires no additional processing. In the case of a fax machine there exists the possibility that network retransmissions and delays have exceeded the time allowed for the sending device to be stalled and thus a false positive call termination sequence would be delivered by the device to the locally connected fax machine. Due to the possibility of a false positive the system must allow for a printed notification to the locally connected device and or an emailed notification. This reasonably rare situation would most often occur when a recipient's device ran out of paper. The solution of sending an email notification is actually a notable advantage to that of the normal operation of a fax machine. If the delivery notification includes the full image of the transferred fax, then the user can have a digital copy of every fax sent or received from the device which can also be used for resending the fax without the need to revisit the fax machine.

The process of fax receive from the ATA device perspective is simpler as audio processing would typically not be required. From the devices perspective the fax receive process works as follows: The device uses a periodic HTTP(s) binary or XML web service polling process to detect when fax received is initiated at the remote server. Upon call detection the local device will begin receipt of the data from the remote server via a polling sequence. Once enough data has been received to ensure data resiliency in case of packet loss or high levels of latency then the ATA will initiate a typical fax receive T.30 process with the fax machine. If the local fax device should run out of paper or otherwise fail, the server would be notified of the error such that a delivery notification failure email can be sent to the sender which included the full image of the fax. The server can also retry the transfer at a later time.

2. HTTP(s) to T.38 Streaming Fax Server

The streaming fax server receives an HTTP(s) call initiation request containing the number to dial, calling phone number, calling station identification, allowed transfer speeds and image and compression types along with account authentication data.

Upon account authentication, the server starts the call process by looking up the destination phone number in a database to determine if the number is a known fax device. If the destination is registered as a fax number, the server may opt to skip the audio portion of the call processing in favor of signaling the sending device to locally spoof the typical call initiation sequence. In principle the first time a number is used the audio processing would be standard, but once the fax device is known to exist at the designated address it would not need to be repeated for subsequent calls. The service can preload preferences and capabilities information on a per destination basis for call optimization.

If audio processing is elected then the server would initiate an audio call immediately upon receipt of a call request. Audio data received from the sending fax device will be buffered before audio playback begins to the destination device whereas the received audio from the destination device will be sent to the sending device immediately. This process ensures that if a user accidentally types in the wrong number they will be able to clearly hear the audio message played by the answering party.

Upon the detection of fax tones from the called phone number (e.g. answering device, a test is performed to see if a reliable transfer can be accommodated, the call would be disconnected if network conditions cannot accommodate a reliable transfer.

Upon receiving of enough data to ensure transfer resiliency typically somewhere between 10 and 60 seconds worth of transmission data, a downstream SIP/MGCP or H.323 call is initiated with T.38 enabled for processing. Upon completion of sending the final scan lines or data block from the sending client the server will signal the fax transfer is complete to the sending client and await client acknowledgement before recording the successful transmission of the fax.

For inbound calls, the process is virtually identical but with the data stream going in the reverse direction and the audio data not being sent to the ATA or server client devices.

Figure 11:
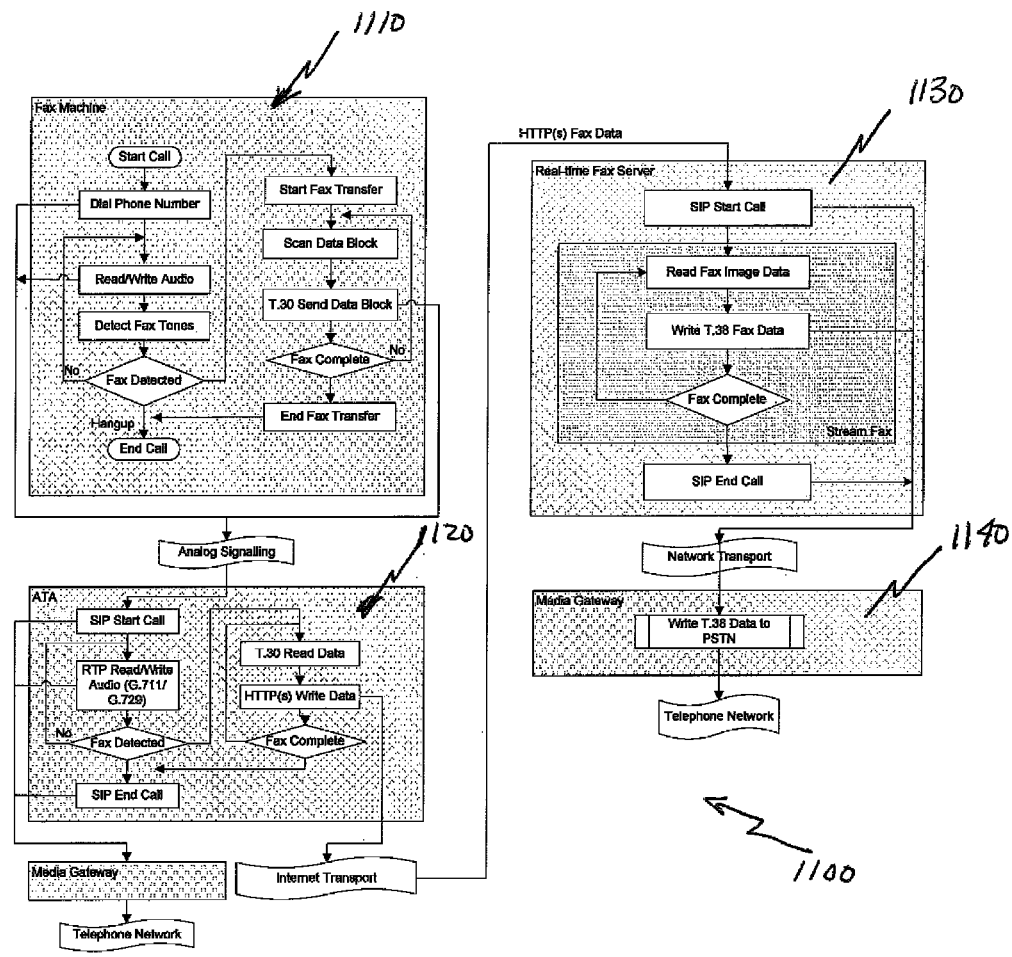
FIG. 11 is a flowchart of the transmission of fax data from a fax machine to an ATA, which is then transmitted via HTTP.

Now referring to FIG. 11, which depicts a flowchart 1100 for the sending a facsimile data across the network as previously shown in FIG. 10. In FIG. 11 the sending a fax transmission involves the steps of:

i) The Fax Machine streaming/transmitting fax images to the ATA using T.30. Step 1110.

ii) The ATA streams fax image data to the fax server via HTTP(s). Step 1120.

iii) The Fax server streams the fax image to media gateway via SIP and associated protocols. Step 1130.

iv) The Media Gateway steams fax image to PSTN via T.30. Step 1140.

v) The Fax Server notifies the ATA of the result.

vi) The ATA prints notification to Fax Machine.

In this operational embodiment the transmission cost is reduced as compared to the traditional store and forward implementations. Also, in this operational embodiment, existing ATA's may simply be modified by a software and/or firmware update, rather than by replacement. By utilizing the existing HTTP(s) protocol, which is well established as a primary and reliable transport on the internet, and incorporating spoofing and buffering techniques within the ATA device, a real-time streaming solution for fax implementation on an ATA. This embodiment would add a very minimal impact to the cost of an off the shelf ATA device.

The embodiment of the invention provides methods to select appropriate algorithms to deliver fax data from PSTN fax devices to an ATA device embedded with multiple invention processing algorithms to determine the mode of transport operation through the IP network to the destination PSTN fax device. It is expected that the various modes of operation and setup of the ATA device will be automated.

The implemented ATA device contains the embedded inventive subject matter that enables the appropriate algorithm to be determined and then activated per each fax transaction. There is no limit on the number of fax transactions that can occur simultaneously, except by that which is limited by the ATA device itself or the number of physical connections that are supported by the ATA device. There is not a limit of ATA devices that can be on attached to the network, nor will the number of ATA devices on the network negatively impact performance other than additional data traffic like any other network device.

The embedded implementation has two main components of the invention. First, the processing modules for the ATA device will include a T.30 driver stack. This T.30 driver stack will enable fully compliant T.30 communication support with the attached fax device used for transmitting the fax data. The communication will be in complete compliance with all of the standards of T.30, security requirements, and user familiar operations. Any and every Group 3 fax device that meets the communication standards of transmitting fax through use of T.30 will be fully compatible. As with Group 3 fax devices, all "high speed" modulations will be supported, that includes V.17 (14.4 kbps, 12.0 kbps, 9.6 kbps and 7.2 kbps), V.29 (9.6 kbps and 7.2 kbps) and V.27 ter (4.8 kbps and 2.4 kbps).

3. Two Call (Full Audio Support Mode)—SIP G.729 Audio

Figure 12:
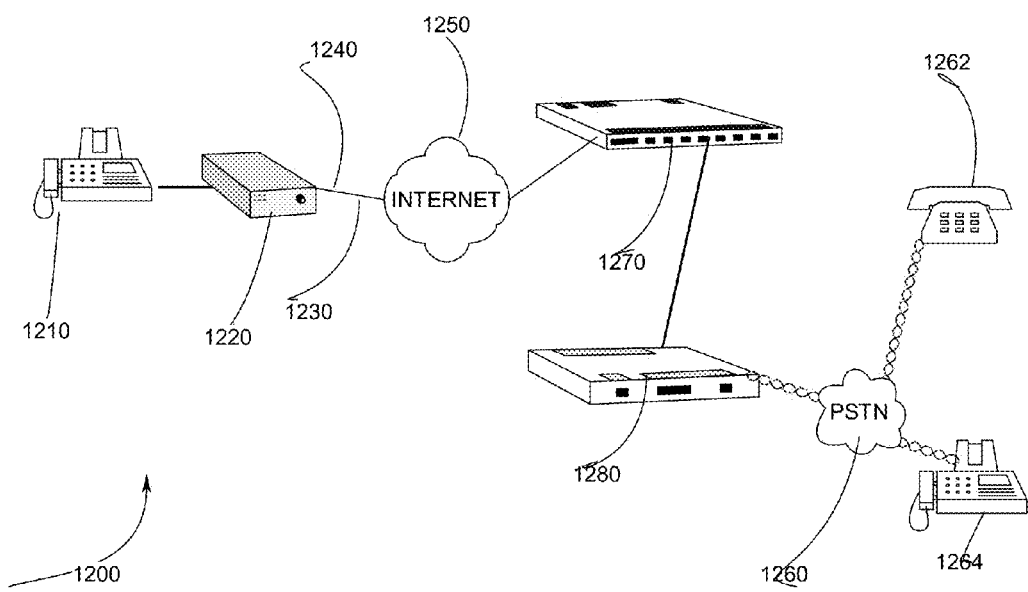
FIG. 12 is a network diagram of a fax machine connected to the Internet via RIP and/or HTTP.

Now referring to FIG. 12 which provides a network diagram 1200 of a system that would support a "Two Call, Full Audio Support Mode" (SIP G.729 Audio). As shown in FIG. 12, a source fax machine 1210 is connected to an ATA 1220. The ATA 1220 supports both SIP/RTP audio connections 1230 and/or HTTPS fax data connections 1240. These connections (e.g. SIP/RTP 1230 and HTTPS fax data 1240) are connected via the internet 1250. The internet 1250 supports connections to the PSTN 1260 and/or the real-time fax server 1270. The real-time fax server 1270 is then connected to a media gateway 1280 which is further connected to the PSTN 1260. The PSTN 1260 is further connected to either a voice connection 1262, or a fax connection 1264.

Figure 13:
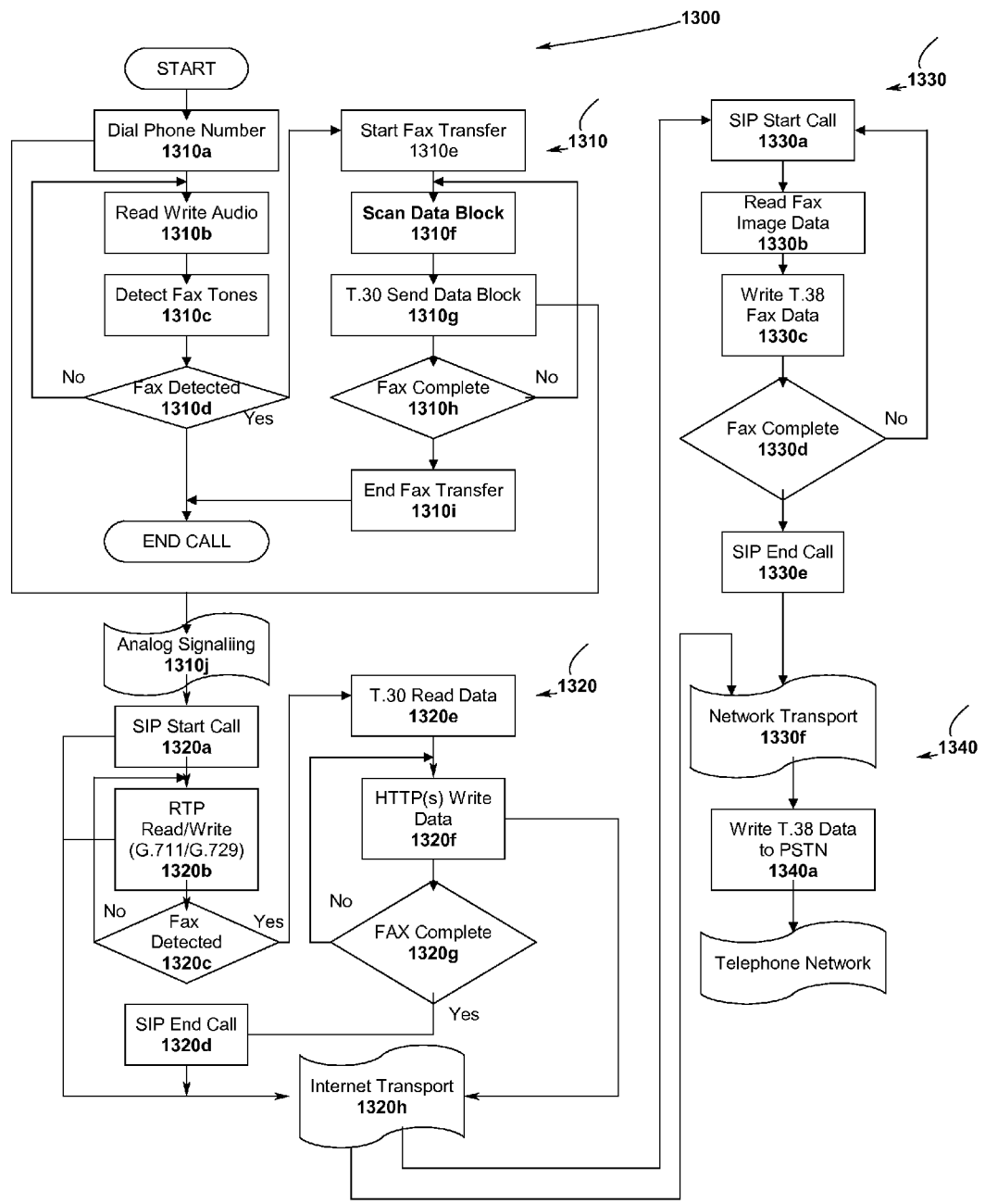
FIG. 13 is a flowchart of data transmitted from the fax machine to the ATA.

Now referring to FIG. 13 which illustrates a flowchart 1300 of the implementation of the "Two Call, Full Audio Support Mode" (SIP G.729 Audio).

The implementation involves sending a fax transmission including but not limited to the steps of:

1) The Fax Machine 1210 streams audio to the ATA 1220. Step 1310.
2) The ATA 1210 streams audio to Media Gateway via SIP 1280 (G.711/G.729-RTP) Step 1320.
3) Media Gateway 1280 streams bi-directional audio to PSTN. Step 1260.
4) Media Gateway 1280 or the ATA 1220 detects fax tones from audio stream.
5) The ATA 1220 switches to Fax mode=T.38 REINVITE.
6) The Fax Machines 1210 streams fax image to ATA via T.30. Step 1330.
7) The ATA 1220 streams fax image data to Fax Server 1270 via HTTP(s). Steps 1320, 1330.
8) The Fax Server 1270 buffers image data.
9) The Fax Server 1270 initiates second call via Media Gateway 1280 using SIP-G.711/G.729 RTP. Step 1320.
10) Fax Server streams fax image to Media Gateway via SIP-G.711/T.38. 1320, 1340.
11) Media Gateway streams fax image to PSTN via T.30. Step 1320.
12) Fax Server notifies ATA of result.
13) The ATA prints notification to Fax Machine.

In the implementation of the proposed embodiment, these T.30 compliant call sequences will occur:

1) a call initiates connection between the transmitting and receiving devices;
2) a pre-message procedure to discover capabilities for determining/negotiate the call session parameters is executed;
3) a fax data transmission and retransmission is executed to guarantee successful representation of fax transmitted;
4) post-message procedures confirming status of fax transmission;
5) call released with an asynchronous termination This embodiment enables transmitting from any T.30 compliant fax device 1210 through the implementation of the ATA device 1220 via the internet to a receiving fax device through a phone call on the switch based network (PSTN).

The ATA device 1220 supports the algorithms and processes to both fax calls and 911 emergency calls. As illustrated, there is the basic mode of operation which includes full functional support for live time faxing and phone number validation. The live time faxing will perform the end-to-end fax transmission as users are familiar with it today, but using a different median and some high advance invention algorithm techniques. The phone number validation faxing is the mode of operation that first performs phone number verification on the recipient fax number prior to transmitting the fax.

The ATA device 1220 also supports the algorithms and processes to initiate a G.711/G.729 message to a targeted gateway to initiate the phone number call for verification that it is a valid phone number for receiving a fax. The call being verified as a valid phone number will be disconnected, the return status message will be processed by the ATA device containing highly intelligent algorithms to properly react to the status and the faxing can initiate. The phone number has been validated and the fax data will be transmitted to the fax server for sending to the phone number upon completion of the faxing.

The ATA device 1220 with the invented algorithms will properly connect and maintain the call if the 911 number has been entered as the phone number to call. The ATA device 1220 will not disconnect the call as with the phone number validation fax mode of operation. This emergency algorithm will take precedence over all other modes of operation that the ATA device can function in. The call will not end until either the caller or the called party disconnects from the call by hanging up.

4. Two Call (Full Audio Support Mode)—HTTP(s) Audio

Figure 14:
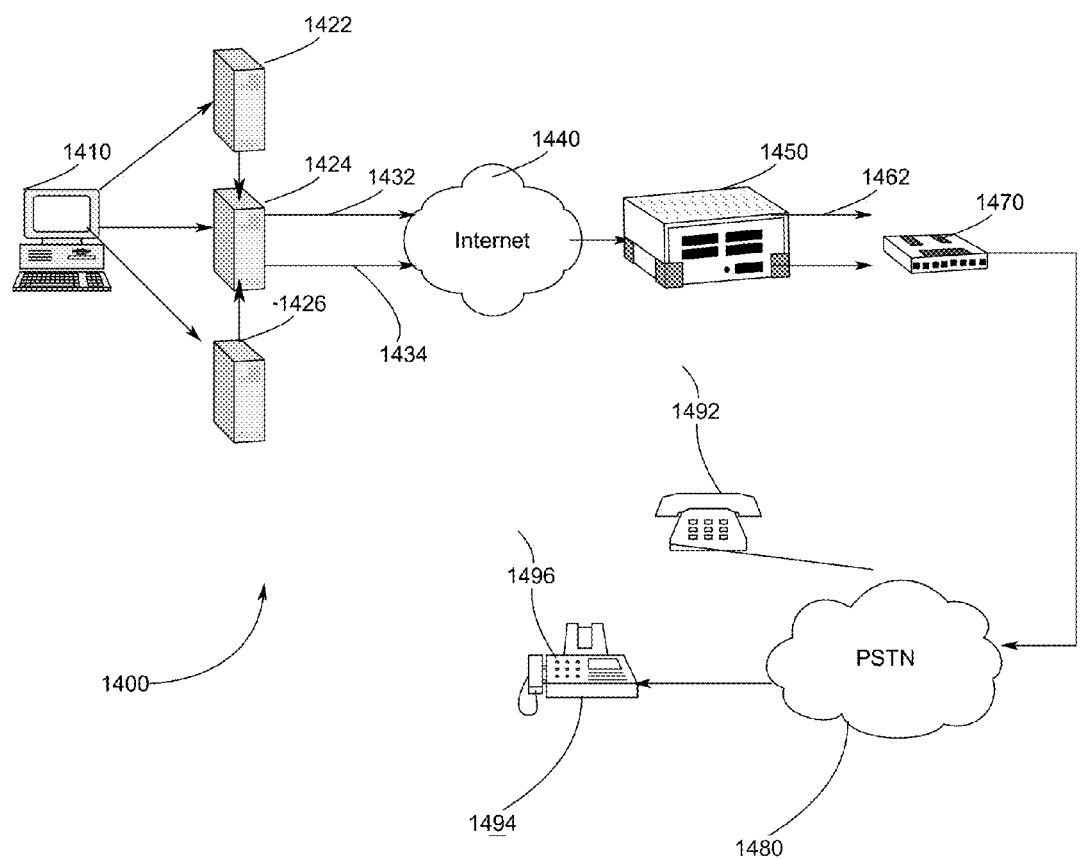
FIG. 14 is a network diagram of workstations transmitting fax data via HTTP through the internet to a fax server.

Now referring to FIG. 14 which provides a network diagram 1400 of a system that would support a "Two Call, Full Audio Support Mode—HTTP(s) Audio" (SIP G.729 Audio). As shown in FIG. 14, a workstation 1410 is connected to an email server 1422, a fax server 1424, and/or a web server 1426. The email server 1422, a fax server 1424, and/or a web server 1426 are connected to the internet 1440 via a HTTP(s) audio 1432 or HTTP(s) 1434 fax data stream. The internet 1440 is interconnected to a real-time fax server 1450. The real-time fax server 1450 is connected to a media gateway 1470 by a SIP/RTP audio connections 1462 and/or HTTPS fax data connections 1464. The media gateway 1470 is further connected to the PSTN 1480. The PSTN 1480 is further connected to either a voice connection 1492, or a fax connection 1494.

Figure 15:
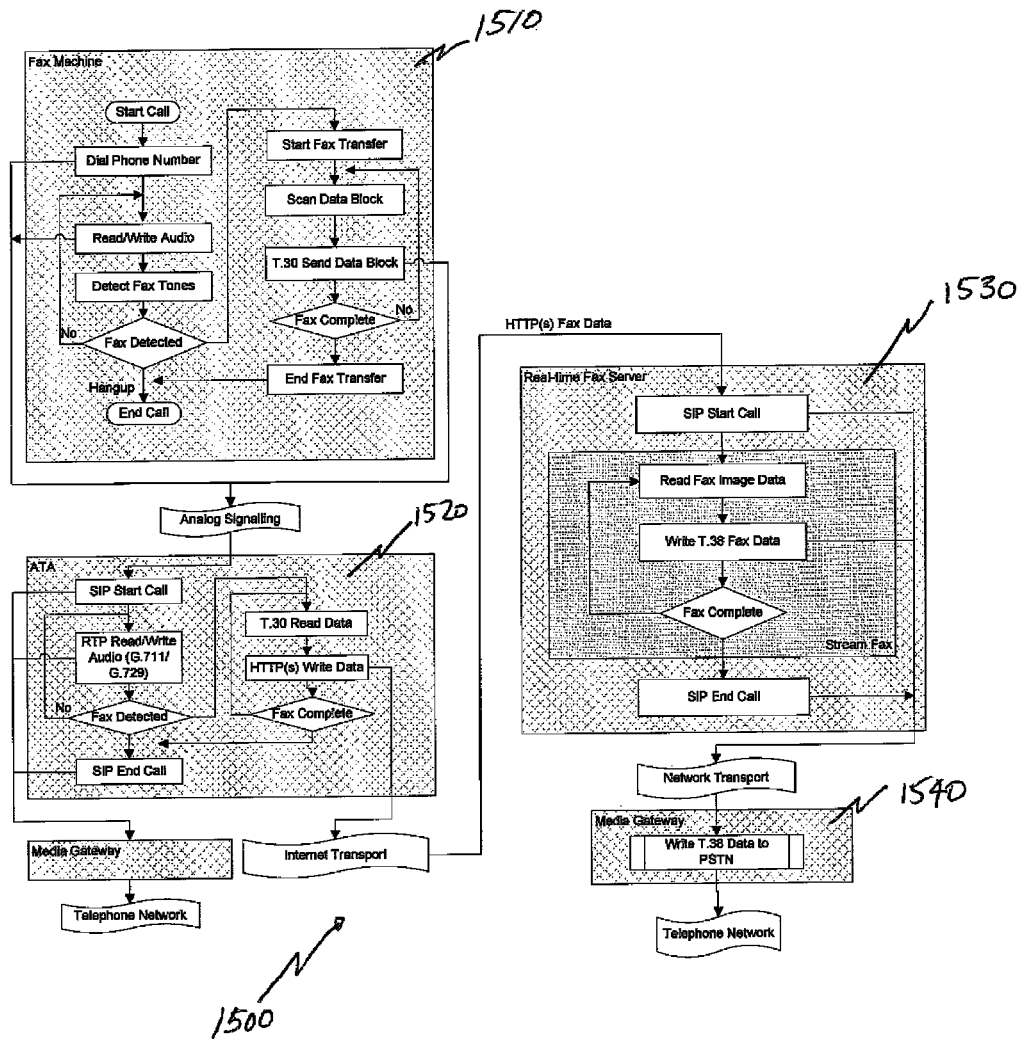
FIG. 15 is a flowchart of the data transmitted from the Fax machine to the ATA

Now referring to FIG. 15 which illustrates a flowchart 1500 of the implementation of the "Two Call, Full Audio Support Mode-HTTP(s) Audio" (SIP G.729 Audio). The implementation involves sending a fax transmission including but not limited to the steps of:

1) Fax Machine streams audio to ATA.
2) ATA streams bi-directional audio to Fax Server via HTTP(s).
3) Fax Server streams audio to Media Gateway via SIP-G.711/G.729 RTP.
4) Media Gateway streams bi-directional audio to PSTN.
5) Media Gateway or ATA detects fax tones from audio stream.
6) ATA switches to Fax mode=T.38 REINVITE.
7) Fax Machines streams fax image to ATA via T.30.
8) ATA Streams fax image to Fax Server via HTTP(s).
9) Fax Server buffers image data.
10) Fax Server initiates second call via Media Gateway using SIP-G.711/G.729 RTP.
11) Fax Server streams fax image to Media Gateway via SIP-G.711/T.38.
12) Media Gateway streams fax image to PSTN via T.30.
13) Fax Server notifies ATA of result.
14) ATA prints notification to Fax Machine.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

I claim:

1. A system for the real-time reliable transmission of facsimile images, the media gateway comprising:
    an analog telephone adapter, the analog telephone adapter capable of streaming a multiplicity of bi-directional audio signals to a fax server via HTTPS, the analog telephone adapter having at least one fax mode of T.38 reinvite;

a media gateway, the media gateway capable of streaming audio signals to the fax server and capable of streaming bi-directional audio to the public switched telephone network;

the fax server further having an facsimile image buffer; said facsimile image buffer capable of receiving facsimilie image data from the analog telephone adapter and further capable of the sequence of initiating a first call; then a initiating a second call via the media gateway using SIP-G.711/G.729 RTP, streaming fax image data via the media gateway using SIP-G.711/T.38, and streaming fax image to PSTN via T.30;

wherein the system supports two call, full audio supports mode-http(s) audio.

2. A system for the real-time reliable transmission of facsimile images according to claim 1, the media gateway further comprising the media gateway streaming audio signals via SIP-G.711/G.729 RTP.

* * * * *